(12) United States Patent
Nakayama et al.

(10) Patent No.: US 9,380,180 B2
(45) Date of Patent: Jun. 28, 2016

(54) ELECTRONIC APPARATUS, INFORMATION PROCESSING SYSTEM, AND INFORMATION PROCESSING METHOD

(71) Applicants: Ryuuichiroh Nakayama, Kanagawa (JP); Tsutomu Ohishi, Tokyo (JP)

(72) Inventors: Ryuuichiroh Nakayama, Kanagawa (JP); Tsutomu Ohishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 84 days.

(21) Appl. No.: 13/742,655

(22) Filed: Jan. 16, 2013

(65) Prior Publication Data

US 2013/0182282 A1 Jul. 18, 2013

(30) Foreign Application Priority Data

Jan. 18, 2012 (JP) ................................ 2012-007780
Nov. 28, 2012 (JP) ................................ 2012-259805

(51) Int. Cl.
*G06K 15/00* (2006.01)
*H04N 1/00* (2006.01)
*H04N 1/44* (2006.01)

(52) U.S. Cl.
CPC ....... *H04N 1/00464* (2013.01); *H04N 1/00832* (2013.01); *H04N 1/4406* (2013.01); *H04N 1/00244* (2013.01); *H04N 2201/0094* (2013.01)

(58) Field of Classification Search
USPC ............................................... 358/1.13–1.18
See application file for complete search history.

(56) References Cited

U.S. PATENT DOCUMENTS

| | | | |
|---|---|---|---|
| 2003/0028753 A1 | 2/2003 | Ohishi | |
| 2006/0187496 A1 | 8/2006 | Ohishi | |
| 2006/0262349 A1 | 11/2006 | Moroi | |
| 2008/0060070 A1* | 3/2008 | Uno | ................................ 726/21 |
| 2009/0240552 A1* | 9/2009 | Yang et al. | ........................ 705/9 |
| 2010/0333068 A1 | 12/2010 | Niimura et al. | |
| 2011/0022377 A1 | 1/2011 | Han et al. | |
| 2011/0099495 A1* | 4/2011 | Harrington | ................... 715/765 |
| 2011/0145843 A1 | 6/2011 | Ohhashi et al. | |
| 2012/0092691 A1* | 4/2012 | Sasakuma | .................... 358/1.13 |

FOREIGN PATENT DOCUMENTS

| | | |
|---|---|---|
| JP | 2004-234252 | 8/2004 |
| JP | 2006-352845 | 12/2006 |
| JP | 2008-229993 | 10/2008 |

* cited by examiner

*Primary Examiner* — Marivelisse Santiago Cordero
*Assistant Examiner* — Kevin Ky
(74) *Attorney, Agent, or Firm* — IPUSA, PLLC

(57) ABSTRACT

An electronic apparatus including: a display control unit configured to cause a display unit to display a screen based on screen information, obtained via a network, for executing a function of the electronic apparatus, wherein the display control unit stores, in a storing unit, identification information of a program corresponding to the screen information according to execution of the function of the electronic apparatus based on definition of the screen information.

12 Claims, 8 Drawing Sheets

ELECTRONIC APPARATUS, INFORMATION PROCESSING SYSTEM, AND INFORMATION PROCESSING METHOD

CROSS-REFERENCE TO RELATED APPLICATIONS

This application claims the benefit of a Japanese Patent Application No. 2012-7780 filed on Jan. 18, 2012, in the Japanese Patent Office, the disclosure of which is hereby incorporated by reference. Also, this application claims the benefit of a Japanese Patent Application No. 2012-259805 filed on Nov. 28, 2012, in the Japanese Patent Office, the disclosure of which is hereby incorporated by reference.

BACKGROUND OF THE INVENTION

1. Field of the Invention

The present invention relates to an electronic apparatus, an information processing system, and an information processing method.

2. Description of the Related Art

In conventional techniques, there is an image forming apparatus on which browser software is installed for displaying HTML (Hyper Text Markup Language) data obtained from a network or from the inside of the apparatus as an operation screen of the image forming apparatus. In various kinds of browser software, there is browser software that can not only display the screen but also execute apparatus control by interpreting a script that is extended for apparatus control. According to such browser software, it is possible to provide a browser-based API (Application Program Interface) such as a script for customization (refer, for example, to JP2006-352845).

For example, third-party vendors develop a Web application for providing the function via a Web page displayed on browser software, so that the third-party vendors can provide services that can use hardware resources of the image forming apparatus via the Web application.

However, in conventional techniques, billing for use of an electronic apparatus, that is an image forming apparatus, for example, is performed with respect to execution of functions, provided by the electronic apparatus itself, such as scanning, printing, FAX transmission and the like. Thus, although billing can be performed for the functions of the electronic apparatus that are executed based on scripts described in the Web page provided by the Web application, billing for use of the Web application itself cannot be performed. As a result, there is a problem in that it is difficult to distribute appropriate profits to a developer of the Web application, a developer of the browser software and the like. This problem similarly applies to various situations in which applications on the network are used in a so-called cloud environment in recent years.

SUMMARY OF THE INVENTION

Accordingly, the present invention is contrived in view of the above-mentioned problem, and an object of the present invention is to provide an electronic apparatus, an information processing system, and an information processing method that can obtain usage status of a program corresponding to screen information that causes the electronic apparatus to display a screen.

According to an embodiment of the present invention, an electronic apparatus is provided. The electronic apparatus includes: a display control unit configured to cause a display unit to display a screen based on screen information, obtained via a network, for executing a function of the electronic apparatus, wherein the display control unit stores, in a storing unit, identification information of a program corresponding to the screen information according to execution of the function of the electronic apparatus based on definition of the screen information.

According to the embodiment, it is possible to obtain usage status of a program corresponding to screen information that causes the electronic apparatus to display a screen.

Other objects and further features of the present invention will be apparent from the following detailed description when read in conjunction with the accompanying drawings.

DESCRIPTION OF THE PREFERRED EMBODIMENTS

Figure 1:
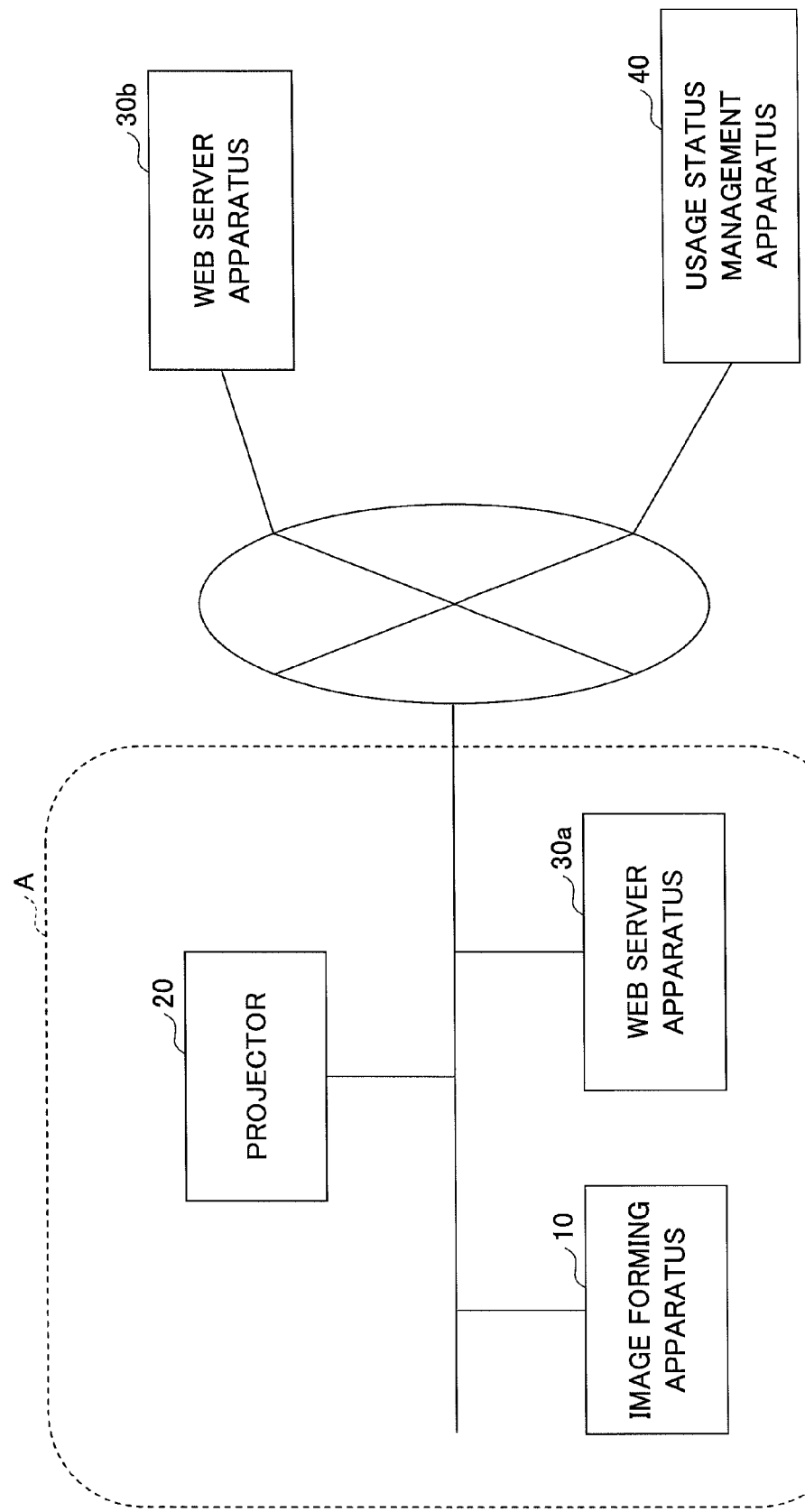
FIG. 1 is a diagram showing a system configuration example in an embodiment of the present invention.
Figure 2:
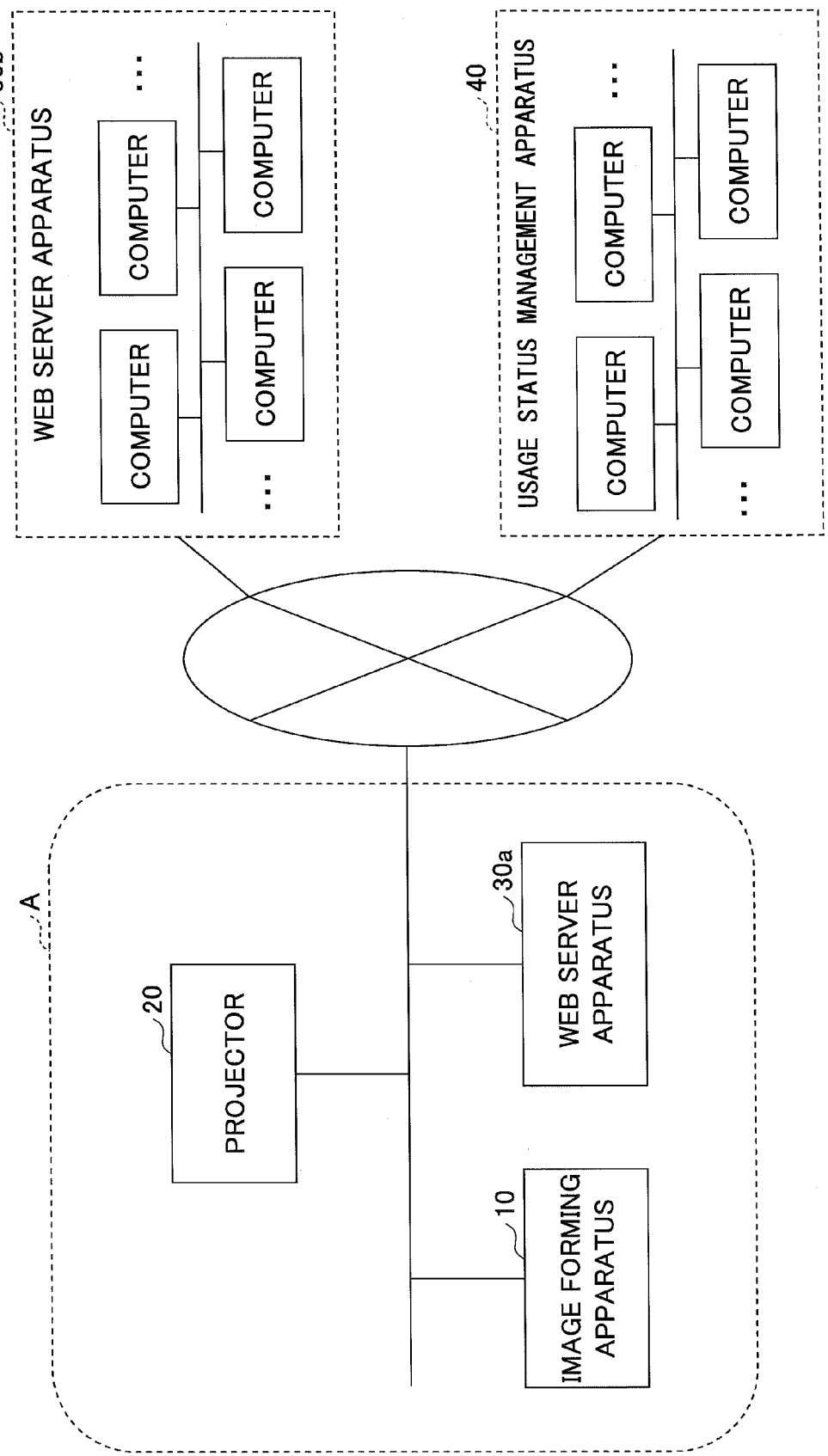
FIG. 2 is a diagram showing a configuration example of an information processing system in a case where Web server apparatuses and usage status management apparatuses are distributed as plural computers.

In the following, embodiments of the present invention are described with reference to the attached drawings. FIG. 1 is a diagram showing a system configuration example in an embodiment of the present invention. As shown in FIG. 1, in an office A, an image forming apparatus 10, a projector 20 and a Web server apparatus 30a are connected via a network such as a LAN (Local Area Network) such that they can communicate with each other.

The office A is an office of an organization. As a first example of an electronic apparatus, the image forming apparatus 10 is a multi-functional machine that realizes two or more functions of printing, scanning copying and FAX transmit and reception and the like within one body. Also, an apparatus having one of the functions in one body may be used as the image forming apparatus 10. In the present embodiment, each image forming apparatus 10 includes a Web browser as a program for causing an operation panel (after-mentioned operation panel 15) to display a Web page and the like. The function of the Web browser is extended for the image forming apparatus 10. Thus, the Web browser included in the image forming apparatus 10 is referred 20 to as "apparatus browser."

The projector 20, which is a second example of an electronic apparatus, is an electronic apparatus for projecting an image. Like the image forming apparatus, the projector 20 may include an apparatus browser as a program for causing an operation panel of the projector 20 to display a Web page.

The Web server apparatus 30a includes a Web application for providing a service via a Web page. In the present embodiment, the "Web page" is data in which screen information and a script and the like are defined or described, in which the screen information is defined based on a predetermined format such as HTML (HyperText Markup Language), and the script includes process instructions to be executed according to operation on a screen that is displayed based on the screen information. In the present embodiment, the screen based on the Web page provided by the Web server apparatus 30a is displayed on the operation panel of the image forming apparatus 10 or the projector 20.

The network environment in the office A is connected to a Web server apparatus 30b and a usage status management apparatus 40 and the like via a wide area network such as the Internet.

The Web server apparatus 30b and the usage status management apparatus 40 may form a part or the whole of a cloud environment which provides applications and services that can be used by plural users via a wide area network such as the Internet. Also, each of the Web server apparatus 30b and the usage status management apparatus 40 may be formed by one computer or by distributed plural computers.

The Web server apparatus 30b is a computer that provides a Web page via a wide area network such as the Internet and that includes a Web application providing a cloud service, for example, via the Web page. When the Web server apparatus 30a and the Web server apparatus 30b are not distinguished from each other, each of them is referred to as "Web server apparatus 30."

The usage status management apparatus 40 is a computer that collectively manages information (to be referred to as usage status information hereinafter) indicating usage status of Web applications included in the Web server apparatus 30a and the Web server apparatus 30b.

Figure 3:
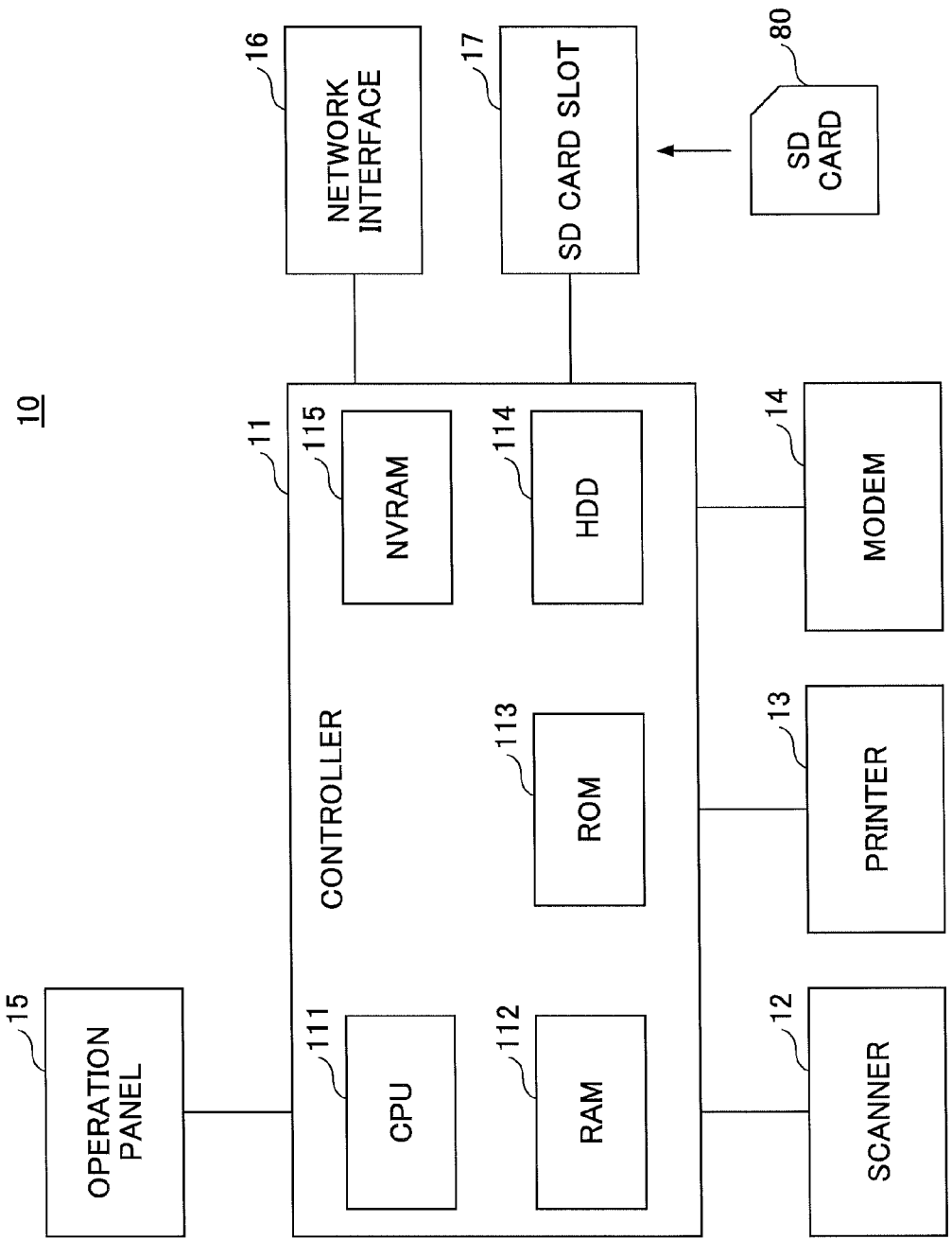
FIG. 3 is a diagram showing a hardware configuration example of an image forming apparatus in an embodiment of the present invention.

FIG. 3 is a diagram showing a hardware configuration example of the image forming apparatus 10 in an embodiment of the present invention. As shown in FIG. 3, the image forming apparatus 10 includes hardware such as a controller 11, a scanner 12, a printer 13, a modem 14, an operation panel 15, a network interface 16, an SD card slot 17 and the like.

The controller 11 includes a CPU 111, a RAM 112, a ROM 113, an HDD 114, and a NVRAM 115. The ROM 113 stores various programs and data used by the programs. The RAM 112 is used as a storage area for loading programs, and a work area of the loaded programs and the like. The CPU 111 realizes various functions by processing the program loaded in the RAM 112. The HDD 114 stores programs and data used by the programs and the like. The NVRAM 115 stores various pieces of setting information and the like.

The scanner 12 is hardware (image reading unit) configured to read image data from a document. The printer 13 is hardware (printing unit) configured to print printing data on a printing paper. The modem 14 is hardware for connecting to a telephone circuit, and is used for executing transmission and reception of image data by fax communication. The operation panel 15 is hardware including an input unit such as buttons for receiving inputs from a user, and a display unit such as a liquid crystal panel and the like. The liquid crystal panel may include a touch panel function. The liquid crystal panel including the touch panel function also serves as an input unit. The network interface 16 is hardware for connecting to a network (cable or radio) such as a LAN and the like. The SD card slot 17 is used for reading a program stored in an SD card 80. That is, in the image forming apparatus 10, not only the program stored in the ROM 113 but also the program stored in the SD card 80 are loaded onto the RAM 112, and may be executed. The SD card 80 may be replaced with another recording medium such as a CD-ROM, a USB (Universal Serial Bus) memory and the like. The kind of the recording medium to be replaced from the SD card 80 is not limited to a particular one. In this case, the SD card slot 17 may be replaced with hardware corresponding to the kind of the recording medium. The SD card 80 and the recording medium are examples of a non-transitory computer-readable recording medium storing a program for causing an electronic apparatus (the image forming apparatus 10, for example) to perform the steps of: causing a display unit to display a screen based on screen information, obtained via a network, for executing a function of the electronic apparatus, and storing, in a storing unit, identification information of a program corresponding to the screen information according to execution of the function of the electronic apparatus based on definition of the screen information.

Figure 4:
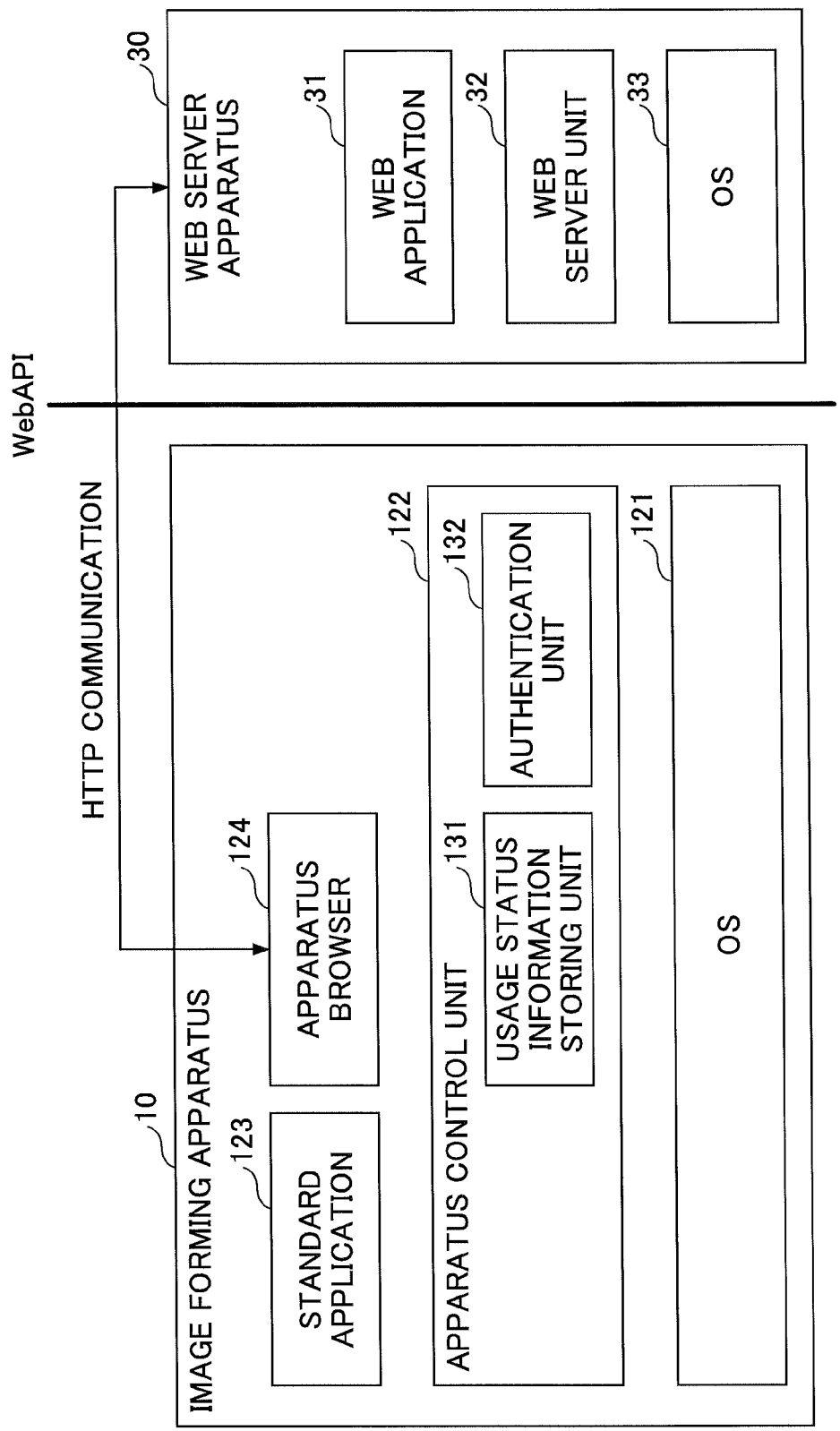
FIG. 4 is a diagram showing a functional configuration example of an image forming apparatus and a Web server apparatus in an embodiment of the present invention.

FIG. 4 is a diagram showing a functional configuration example of the image forming apparatus 10 and the Web server apparatus 30 in an embodiment of the present invention. As shown in FIG. 4, the image forming apparatus 10 includes an OS 121, an apparatus control unit 122, a standard application 123, an apparatus browser 124 and the like. Each of the units is realized by processes executed by the CPU 111 according to a program installed in the image forming apparatus 10.

The OS 121 is a general operating system. The apparatus control unit 122 provides API (Application Program Interface) to each application program, wherein the API is related to control of hardware resources of the image forming apparatus 10, and to processing common to plural application programs, and the like. The apparatus control unit 122 performs control and the like for hardware resources of the image forming apparatus 10 in response to a call via the API. The apparatus control unit 122 includes a usage status information storing unit 131 and an authentication unit 131 as units for executing processing common to plural application programs. In the present embodiment, the usage status information storing unit 131 stores usage status information of the Web application in the image forming apparatus 10. The usage status information storing unit 131 can be realized by a nonvolatile storage unit such as the HDD 114 or the NVRAM 115. The authentication unit 132 identifies identification information (user name and the like) of an operator by authenticating the operator of the image forming apparatus 10.

The standard application 123 is a set of application programs for causing the image forming apparatus 10 to execute jobs on basic functions of the image forming apparatus 10 such as copying, scanning, printing, FAX transmission and the like.

The apparatus browser 123 is the above-mentioned apparatus browser. The apparatus browser 124 is implemented in the image forming apparatus 10 as one of the application programs, for example.

On the other hand, the Web server apparatus 30 includes a Web application 31, a Web server unit 32, and an OS 33 and the like. Each of the units is realized by processes executed by the CPU of the Web server apparatus 30 according to a program installed in the Web server apparatus 30.

The Web application 31 is an example of a Web application that provides a service via a Web page. Plural Web applications 31 that provide services different from each other may be implemented in one Web server apparatus 30. The Web server unit 32 executes HTTP (HyperText Transfer Protocol) communication and the like with the apparatus browser 124, so as to request a Web application 31 corresponding to a request (HTTP request) received from the apparatus browser 124 to execute processing. The Web server unit 32 returns, to the apparatus browser 124, a response (HTTP response) including a Web page that is generated and output by the Web application 31 as a result of execution of the processing.

The OS 33 is a general operating system. A WebAPI that is an API (Application Program Interface) for a Web application is realized by the apparatus browser 124 of the image forming apparatus 10. More specifically, HTML and a script (including extended script) and the like that can be interpreted by the apparatus browser 124 correspond to an example of the WebAPI. It is necessary that a developer of the Web application develops a Web application according to the WebAPI. In other words, it is necessary that the developer of the Web application develops a Web application so as to generate and output a Web page of a format complying with the WebAPI.

The Web application may exist within the image forming apparatus 10. In this case, HTTP communication is executed between a Web server function and the apparatus browser 124 in the image forming apparatus 10. The Web server function executes a function similar to the Web server unit 32.

In the following, a process procedure that is executed by the image forming apparatus 10 and the Web server apparatus 30 is described.

Figure 5:
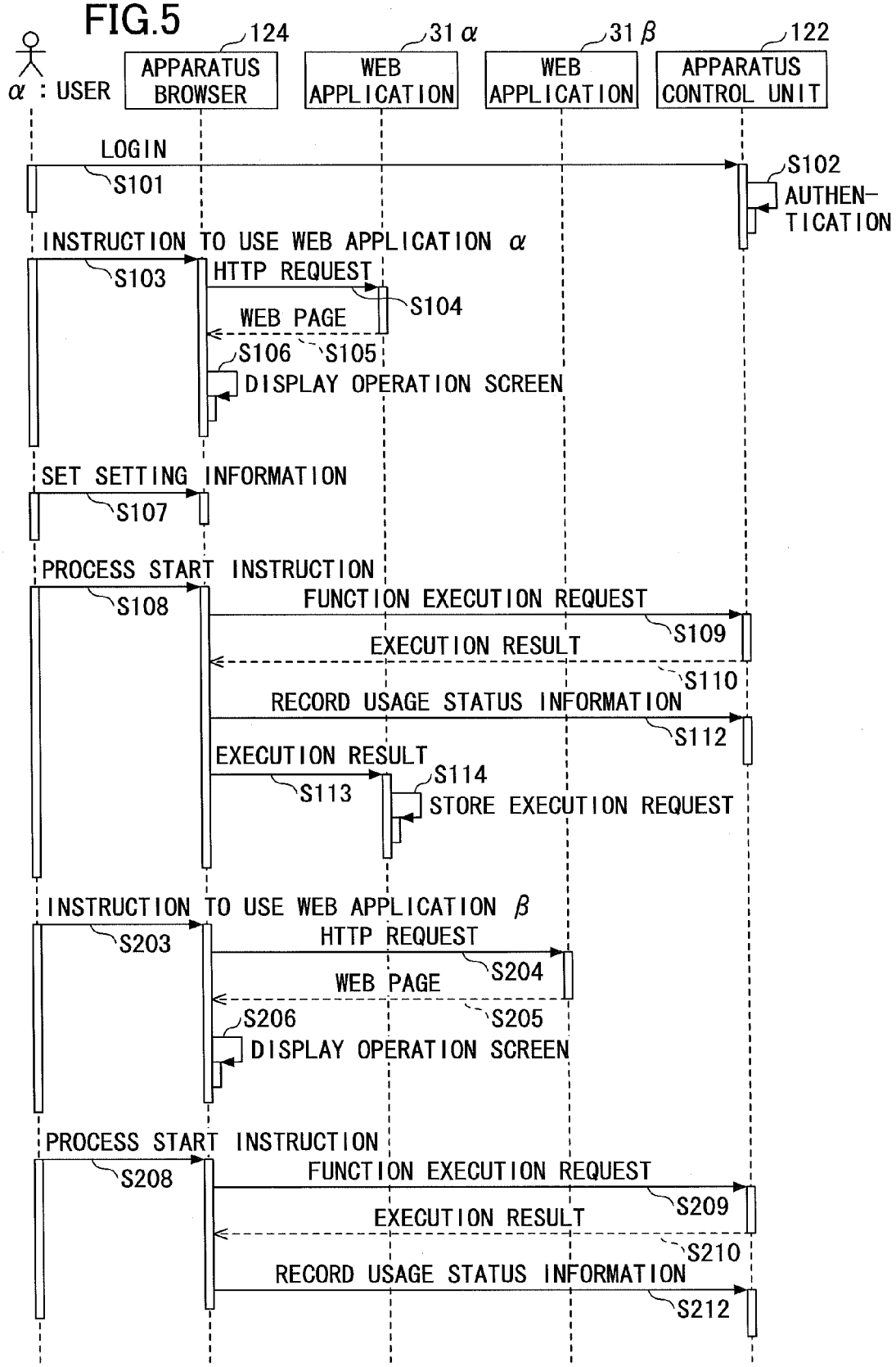
FIG. 5 is a sequence diagram for explaining an example of a process procedure for recording usage status information of a Web application.

FIG. 5 is a sequence diagram for explaining an example of a process procedure for recording usage status information of Web applications. In FIG. 5, for the sake of convenience of explanation, it is assumed that both of the Web application 31α and the Web application 31β are placed in the Web server apparatus 30b.

In step S101, a user logs in to the image forming apparatus 10. For example, the login is performed by entering a user name and a password to a login screen displayed on the operation panel 15 of the image forming apparatus 10. The authentication unit 132 of the image forming apparatus 10 performs authentication based on the user name and the password entered at the login in step S102. The authentication may be performed using an authentication method based on authentication information in the electronic apparatus or an authentication method of using an external server (not shown in the figure) such as LDAP. When the authentication succeeds, the authentication unit 132 deletes the login screen such that applications included in the image forming apparatus 10 can be used. By the authentication, each of the applications of the image forming apparatus 10 can identify the user name of the operator of the image forming apparatus 10.

Next, use of the apparatus browser 124 is instructed by the user, so that a URL (Uniform Resource Locator) corresponding to the Web application 31α is entered to a browser screen displayed on the operation panel 15 by the apparatus browser 124 in step S103. The entry of the URL corresponds to use instruction of the Web application 31α. The apparatus browser 124 transmits an HTTP request to the URL (Uniform Resource Locator) in step S104.

The HTTP request is received by the Web server unit 32 of the Web server apparatus 30b. The Web server unit 32 supplies the HTTP request to the Web application 31α corresponding to the URL specified in the HTTP request. The Web application 31α outputs a Web page that includes screen information of an operation screen for entering setting information (or execution condition) and that includes an extended script indicting an execution command of function of the image forming apparatus 10 based on the setting information. The Web server unit 32 returns an HTTP response including the Web page to the apparatus browser 123 in step S105.

In response to receiving the HTTP response, the apparatus browser 124 causes the operation panel 15 to display an operation screen of the Web application 31 31α based on screen information of the Web page included in the HTTP response in step S106.

Setting information is entered by the user via the operation screen in step S107. When process start instruction is entered in step S108, the apparatus browser 124 executes steps S109, S112 and S113 and the like based on the extended script included in the Web page that is being displayed.

In step S109, the apparatus browser 124 requests the apparatus control unit 122 to execute a function according to the extended script. For example, execution of printing, execution of scanning, execution of fax transmission or the like is requested. At this time, setting information entered via the operation screen is designated. For example, in a case when scanning is executed, setting information on scanning (such as resolution, designation of color or monochrome, and so on) is entered on the operation screen.

The apparatus control unit 122 causes the image forming apparatus 10 to execute the requested function, and responds an execution result of the function to the apparatus browser 124 in step S110. In a case when the response from the apparatus control unit 122 indicates success of the execution of the function, the apparatus browser 124 records usage status information on the Web application 31α in the usage status information storing unit 131 in step S112.

Figure 6:
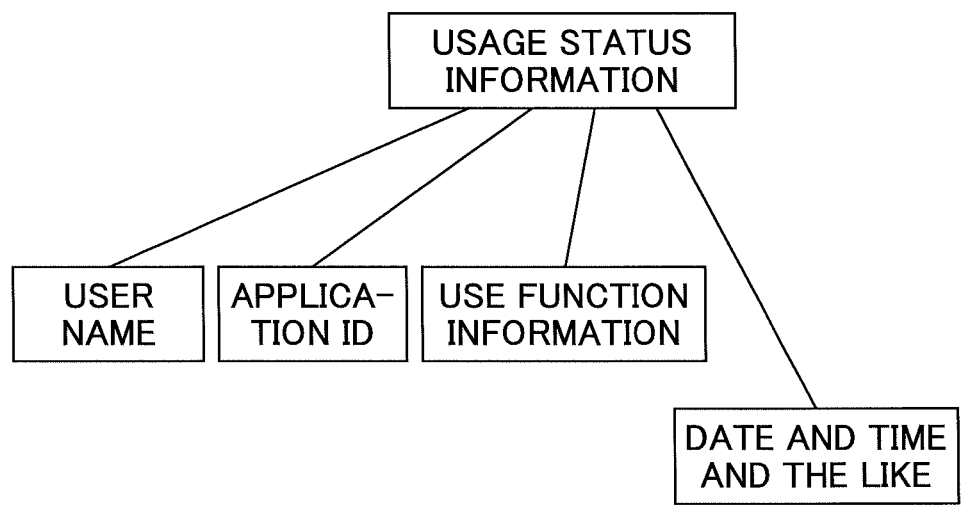
FIG. 6 is a diagram showing a configuration example of usage status information.

FIG. 6 is a diagram showing a configuration example of the usage status information. As shown in FIG. 6, the usage status information includes a user name, an application ID, use function information and the like. That is, the usage status information is information in which the use name, the application ID and the use function information and the like are associated with each other.

The user name is a user name of a user who logged in. Thus, the user name is obtained in step S101. The application ID is identification information of the Web application 31α. It is only necessary that the application ID is information that can identify each Web application 31. For example, in a case where URL is used as the application ID, the application ID is obtained in step S103. Execution of the Web application 31 can be also ascertained as execution of the apparatus browser 124. Therefore, the application ID may include identification information of the apparatus browser 124 in addition to identification information of the Web application 31.

The use function information is information on a function, of the image forming apparatus 10, that is executed based on the extended script. For example, the use function information includes identification information of the function, and setting information on the function. The identification information of the function is identified in implementation within the apparatus browser 124 corresponding to an extended script which causes the step S109 and the like. The setting information on the function is obtained in step S107.

The usage status information may include other information such as date and time when the Web application 31α is executed. The date and time when the Web application 31α is executed is synonymous with date and time when the function of the image forming apparatus 10 is executed based on the extended script included in the Web page provided by the Web application 31α.

The usage status information is recorded so as to store information, in the image forming apparatus 10, indicating who used which function of the image forming apparatus 10 based on which Web application 31, and so on.

Next, the apparatus browser 124 transmits an HTTP request including a result of execution of the function of the image forming apparatus 10 based on the extended script to a URL that is designated in an argument of an extended script including a transmission command of the HTTP request in step S113, for example. The HTTP request is received by the Web server unit 32 of the Web server apparatus 30b. The Web server unit 32 supplies the HTTP request to the Web application 31α corresponding to the URL designated for the HTTP request. The Web application 31α stores the execution result included in the HTTP request in a storage device of the Web server apparatus 30b, for example, in step S114.

Steps after the next step S203 indicate an example of a process procedure executed when the Web application 31β is used next. Steps S203, S204, S205, S206, S208, S209, S210 and S212 correspond to steps S103, S104, S105, S106, S108, S109, S110 and S112 respectively. Therefore, detailed description on the steps after step S203 is not given.

After step S203, step S207 corresponding to step S107 does not exist since setting information is not entered by the user via the operation screen displayed based on a Web page of the Web application 31 in this case, for example. As cases in which the setting information is not entered, for example, there are cases where setting information displayed as a default value on the operation screen is adopted, and where setting information other than the default value cannot be entered, and the like.

Also, steps S213 and S214 corresponding to steps S113 and S114 do not exist. The reason is that the Web page of the Web application 31β does not define an extended script indicating a transmission command for transmitting a result of execution of a function of the image forming apparatus 10. That is, whether to record, in the Web server apparatus 30b, the result of execution of the function of the image forming apparatus 10 depends on the implementation of the Web application 31 (depends on definition contents of the Web page output by the Web application 31).

Each time when the Web application 31 is executed, that is, each time when the extended script included in the Web page provided by the Web application 31 is executed, processes shown in FIG. 5 are executed so that usage status information on the Web application 31 used in the image forming apparatus 10 is stored in the usage status information storing unit 131 of the image forming apparatus 10.

The processes shown in FIG. 5 may be executed also for the standard application 123. In this case, in FIG. 5, the apparatus browser 124 is replaced with the standard application 123. The reason is that, the apparatus browser 124 and the standard browser 123 are common for the image forming apparatus 10 in the sense that each of them is an application program in the image forming apparatus. But, as to the standard application 123, steps S104-S106, S113 and S114 are not executed. A type of an application indicating whether the application is the standard application 123 or the Web application 31 may be identified based on the application ID.

The usage status information stored in the above-mentioned way is transferred to the usage status management apparatus 40 at a predetermined timing. The transfer is performed by the apparatus control unit 122, for example. For example, the usage status management apparatus 40 performs aggregate calculation (compilation) and the like on usage status for each application program and for each Web application 31, for each of plural image forming apparatuses 10 based on the transferred usage status information.

Figure 7:
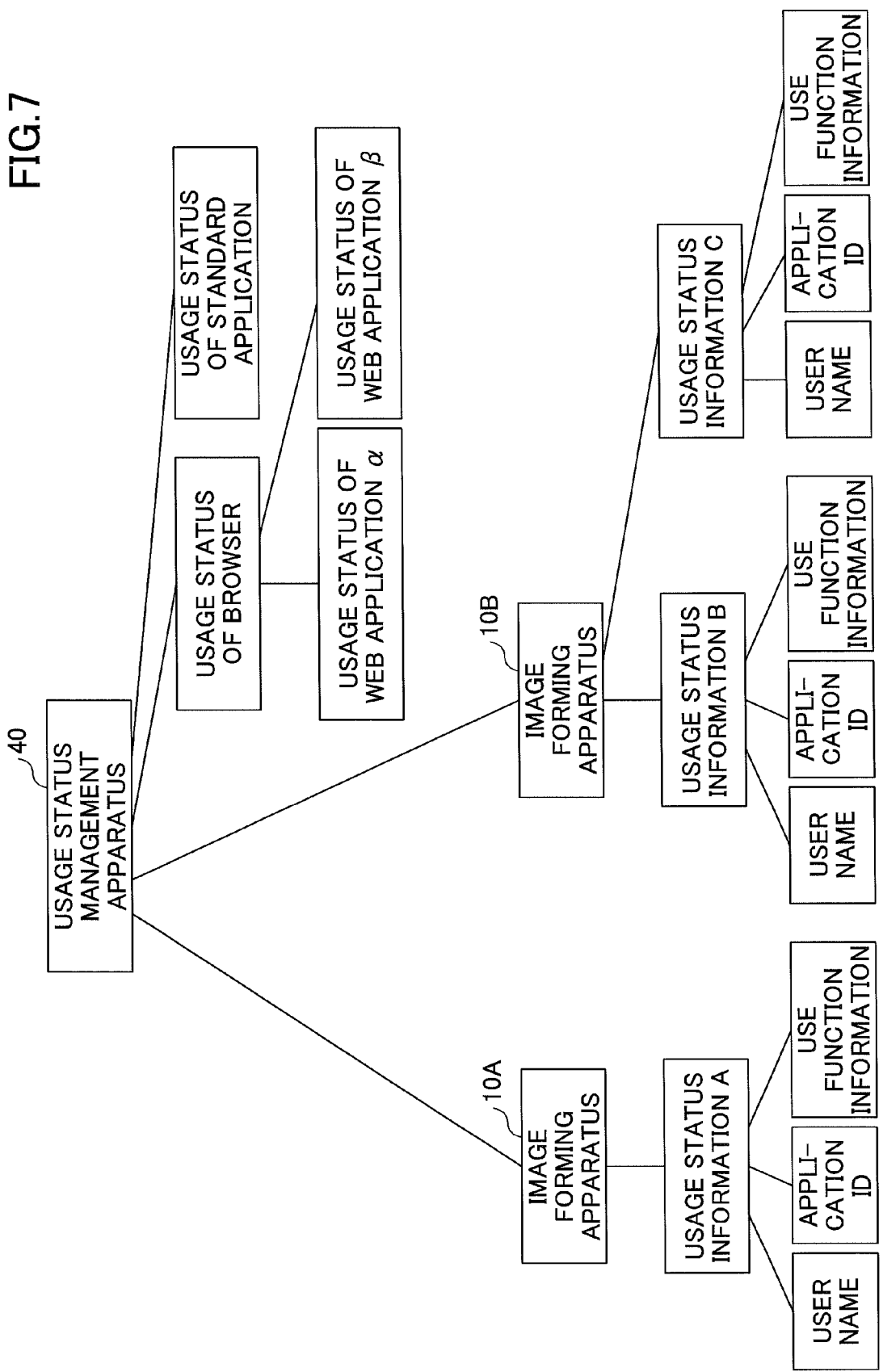
FIG. 7 shows a compilation example of usage status information.

FIG. 7 shows an aggregate example of the usage status information. FIG. 7 shows an example in which usage status information A is stored in the image forming apparatus 10A, and, usage status information B and usage status information C are stored in the image forming apparatus 10B.

The usage status management apparatus 40 collects, from the image forming apparatus 10A and the image forming apparatus 10B, pieces of usage status information A, B and C, and aggregates usage status (usage information such as the number of times of use, use frequency, or the like) of each Web application 31 such as the Web application 31α and the Web application 31β, and aggregates usage status (usage information such as the number of times of use, use frequency, or the like) of the standard application 123, for the image forming apparatuses 10A and 10B. As shown in FIG. 7, the usage status of the apparatus browser 124 may be calculated by integrating usage status of each Web application 31.

The usage status aggregated (compiled) in the above-mentioned way can be used as billing information for a user of the Web application 31, for example. A Web application 31 for a billing target can be specified based on the application ID of the Web application 31 in the usage status information. A user for billing destination can be specified based on a user name in the usage status information.

In the above example, a use name of a login user of the image forming apparatus 10 is included in the usage status information. Instead of that, information that can identify a customer (company user or individual user or the like) of a manufacturer of the image forming apparatus 10 or a vendor of the Web application 31 may be recorded in the usage status information. An example of such information is an identification name of the customer (company name, for example). The identification name may be stored in each image forming apparatus 10. Also, information that can identify each machine of the image forming apparatus 10 (manufacturing number, for example) may be used as information that can identify the customer. In general, a sale destination of each image forming apparatus 10 is managed for each machine. Therefore, the customer who uses the image forming apparatus 10 can be specified based on identification information of the machine of the image forming apparatus 10.

The user name may not be included in the usage status information in a case where each customer can be identified by external information of the usage status information, that is, for example, in a case where the usage status management apparatus 40 is installed in each customer, or in a case where storage location of the usage status information in the usage status management apparatus 40 is distinguished for each customer, or the like. Also, in a case where the use function information is not used, the use function information may not be included in the usage status information. As an example of usage of the use function information, billing amount may be changed according to the use function information, that is, according to the function of the image forming apparatus 10 that is used based on the extended script, for example.

As to profits to be obtained by billing for the Web application 31, the profits may be properly distributed to a developer of the apparatus browser 124 and a developer of the Web application 31 by determining distribution ratio between the apparatus browser 124 and the Web application 31.

The usage status information storing unit 131 may be included in the usage status management apparatus 40. In this case, in step S112 or S212 of FIG. 5, the apparatus browser 124 transfers usage status information to the usage status management apparatus 40. The usage status management apparatus 40 records the transferred usage status information in the usage status information storing unit 131 of the usage status management apparatus 40.

As mentioned above, according to the present embodiment, usage status of each Web application 31 used in the image forming apparatus 10 can be ascertained. As a result, for example, billing (charging) can be performed for use of the Web application 31 and the apparatus browser 124 based on the usage status, for example. As a result, an incentive can be provided for development of the Web application 31, so that possibility can be increased that various services by the Web application 31 are provided in the market. As a result, options of services available in the image forming apparatus 10 increase, so that users can enjoy convenience by various services.

The present embodiment may be applied to electronic apparatuses, other than the image forming apparatus 10, such as the projector 20, a smartphone, a mobile phone, a digital camera, a tablet terminal, a TV conference system or the like, which can implement a Web browser on its operation panel.

Figure 8:
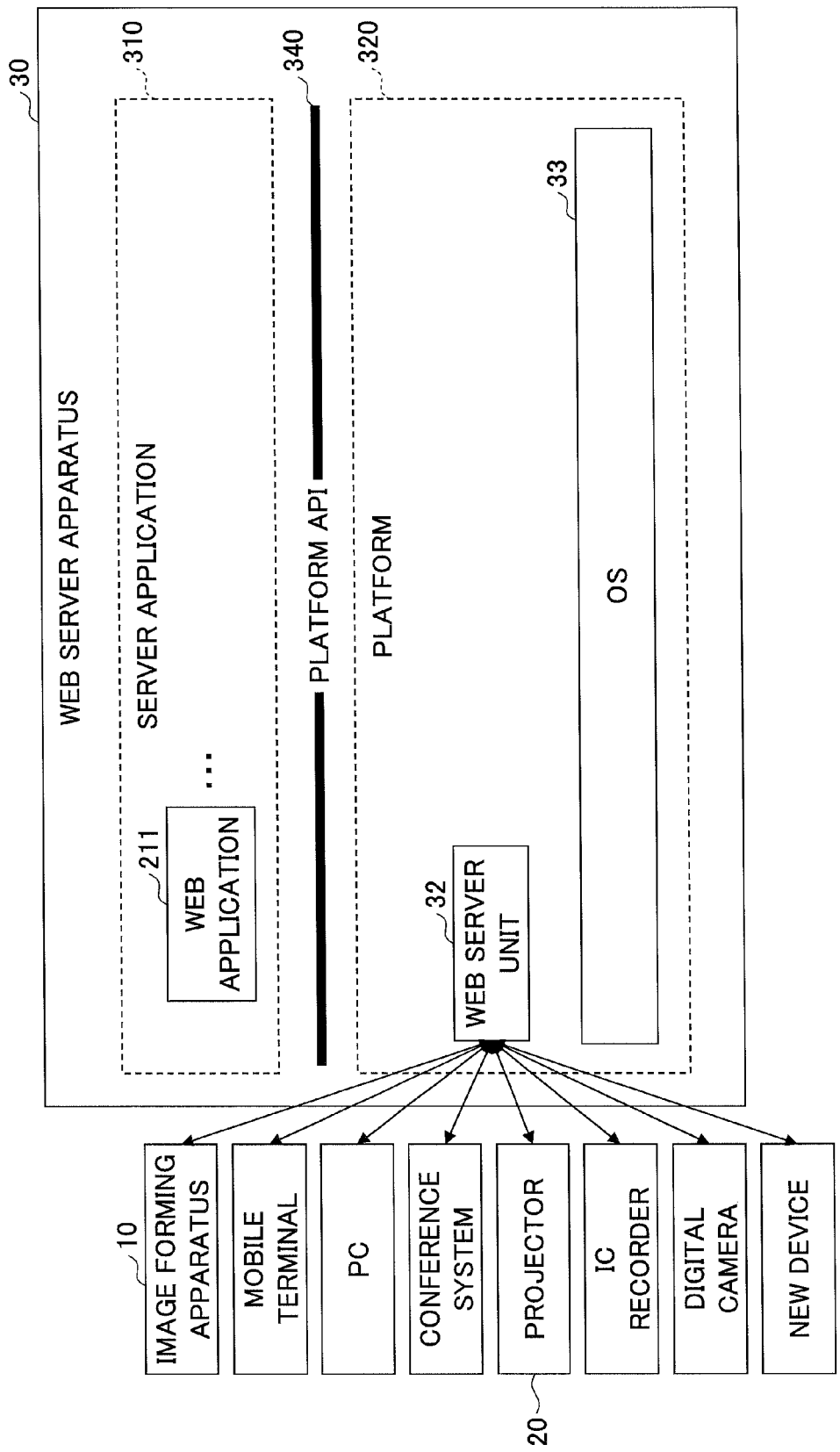
FIG. 8 is a diagram showing a second functional configuration example of a Web server apparatus in an embodiment of the present invention.

As shown in FIG. 8 for example, a layered architecture may be adopted as the functional configuration of the Web server apparatus 30.

FIG. 8 is a diagram showing a second functional configuration example of the Web server apparatus in an embodiment of the present invention. In FIG. 8, the same units as those of FIG. 4 are assigned the same reference symbols, and the description of them is not provided.

In FIG. 8, software of the Web server apparatus 30 is classified to layers including a server application 310 and a platform 320.

The server application 310 is an application program by which the Web server apparatus 30 realizes a service to be provided. The service may be realized by collaboration between the server application 310 and the image forming apparatus 10. Also, the service may be realized by collaboration with another cloud service and the like such as an online storage and the like. In the present embodiment, the Web application 31 is an example of the server application 310.

The platform 320 includes a function common to plural server applications 310, or a basic function used by plural server applications 310. In the present embodiment, the Web server unit 32 and the OS 33 belong to the platform 320. Functions of each unit of the platform 320 are disclosed to the server application 310 via the platform API 320. In other words, each function of each unit can be used by the server application 310 as long as the function is disclosed by the platform API 340.

The classification of each piece of software shown in FIG. 8 and each storing unit is an example. In order to carry out the present embodiment, it is not essential that each piece of software and each storage unit of the Web server apparatus 30 are classified as the layers shown in FIG. 8. That is, as long as apparatuses such as the image forming apparatus 10 can collaborate with the server application 310, hierarchical relationship of the software and the storage unit in the Web server apparatus 30 is not limited to a particular one.

As shown in FIG. 8, services provided by the Web server apparatus 30 may be used, via a network, by a mobile terminal, a PC, a conference system, an IC recorder, a digital camera, and other new devices, in addition to the image forming apparatus 10 and the projector 20.

In the present embodiment, the apparatus browser 124 is an example of a display control unit. The operation panel 15 is an example of a display unit. The usage status information storing unit is an example of a storing unit.

As described above, according to an embodiment of the present invention, an electronic apparatus is provided. The electronic apparatus includes:

a display control unit configured to cause a display unit to display a screen based on screen information, obtained via a network, for executing a function of the electronic apparatus, wherein the display control unit stores, in a storing unit, identification information of a program corresponding to the screen information according to execution of the function of the electronic apparatus based on definition of the screen information.

In the electronic apparatus, the screen information is a Web page, and the display control unit stores, in the storing unit, identification information of a Web application program related to the Web page according to execution of the function of the electronic apparatus based on definition of the Web page.

In the electronic apparatus, the display control unit stores, in the storing unit, identification information of the Web application program related to the Web page according to execution of the function of the electronic apparatus based on a script defined in the Web page.

In the electronic apparatus, the display control unit stores, in the storing unit, identification information of the Web application program related to the Web page based on a script defined in the Web page.

The electronic apparatus may further includes: an authentication unit configured to authenticate an operator based on identification information of the operator entered in the electronic apparatus, wherein the display control unit stores, in the storing unit, the identification information of the operator by associating the identification of the operator with the identification information of the program.

In the electronic apparatus, the display control unit stores, in the storing unit, identification information of the function of the electronic apparatus executed based on the definition of the screen information by associating the identification information of the function with the identification information of the program.

According to an embodiment of the present invention, an information processing system including plural electronic apparatuses and an information processing apparatus connected to the electronic apparatuses via a network is provided. The information processing system includes:

a display control unit configured to cause a display unit of the electronic apparatuses to display a screen based on screen information, obtained via a network, for executing a function of the electronic apparatuses, wherein the display control unit stores, in a storing unit, identification information of a program corresponding to the screen information according to execution of the function of the electronic apparatuses based on definition of the screen information, and the information processing system aggregates usage information for each program for the electronic apparatuses based on information stored in the storing unit.

In the information processing system, the usage information is a number of times of use or a use frequency. The information processing apparatus may include the storing unit.

According to an embodiment, an information processing apparatus connected to electronic apparatuses via a network is provided. Each of the electronic apparatuses includes:

a display control unit configured to cause a display unit to display a screen based on screen information, obtained via a network, for executing a function of the electronic apparatus, wherein the display control unit stores, in a storing unit, identification information of a program corresponding to the screen information according to execution of the function of the electronic apparatus based on definition of the screen information, the information processing apparatus aggregates usage information for each program for the electronic apparatuses based on information stored in the storing unit.

In the information processing apparatus, the usage information is a number of times of use or a use frequency. The information processing apparatus may include the storing unit.

According to an embodiment, an information processing method performed by an electronic apparatus that includes a display control unit configured to cause a display unit to display a screen based on screen information, obtained via a network, for executing a function of the electronic apparatus is provided. The information processing method, performed by the display control unit, includes:

a step of storing, in a storing unit, identification information of a program corresponding to the screen information according to execution of the function of the electronic apparatus based on definition of the screen information.

According to an embodiment, an information processing method in an information processing system including plural electronic apparatuses and an information processing apparatus connected to the electronic apparatuses via a network is provided. Each electronic apparatus includes: a display control unit configured to cause a display unit to display a screen based on screen information, obtained via a network, for executing a function of the electronic apparatus. The information processing method includes:

a storing step, performed by the display control unit of an electronic apparatus, of storing, in a storing unit, identification information of a program corresponding to the screen information according to execution of a function of the electronic apparatus based on definition of the screen information, a step, performed by the information processing apparatus, of aggregating usage information for each program for the electronic apparatuses based on information stored in the storing unit.

In the information processing method, the usage information is a number of times of use or a use frequency.

According to an embodiment, a non-transitory computer-readable recording medium is provided. The non-transitory computer-readable recording medium stores a program for causing an electronic apparatus to perform the steps of:

causing a display unit to display a screen based on screen information, obtained via a network, for executing a function of the electronic apparatus, and storing, in a storing unit, identification information of a program corresponding to the screen information according to execution of the function of the electronic apparatus based on definition of the screen information.

The present invention is not limited to these embodiments, but various variations and modifications may be made without departing from the scope of the present invention described in the claims.

What is claimed is:

1. An electronic apparatus having a plurality of functions for executing processes in the electronic apparatus by a plurality of programs and a particular program of the electronic apparatus, said electronic apparatus comprising:

a central processing unit for processing a program installed in the electronic apparatus; and a display control unit configured to cause a display unit to display a screen based on screen information including a Web page for providing a cloud service, obtained via a network, for executing the plurality of functions of the electronic apparatus, said screen information including a first screen information to display the screen and a second screen information to execute the plurality of functions of the electronic apparatus, said second screen information including a script to execute a function of an image forming apparatus that is readable by an apparatus browser, said display control unit being further configured to store, in the storing unit, identification information of a Web application program for providing the cloud service, said Web application program being related to the Web page of the cloud service according to execution of the function of the electronic apparatus based on definition of the Web page of the cloud service, wherein, when a request from a screen displayed in the display unit is related to the first screen information, the display control unit causes the display to display a screen according to the request, and wherein, when the request is related to the second screen information, the display control unit stores, in a storing unit, identification information of a user of the electronic apparatus, identification information of a program of the plurality of programs that was executed corresponding to the screen information according to execution of the function of the electronic apparatus based on definition of the screen information, and identification information of the function that has been executed by executing the program of the plurality of programs based on an extended script, said identification information of the user, program and function being associated with each other in the storing unit, wherein the apparatus browser is configured to transmit an HTTP request including a result of execution of the electronic apparatus based on the extended script to a Web server unit, wherein the identification information of the program includes identification information of the apparatus browser, and wherein the storing unit further stores a distribution ratio of profit of the use of the electronic apparatus between the apparatus browser and the Web application program.

2. The electronic apparatus as claimed in claim 1, wherein the display control unit stores, in the storing unit, identification information of the Web application program related to the Web page according to execution of the function of the electronic apparatus based on a script defined in the Web page.

3. The electronic apparatus as claimed in claim 1, wherein the display control unit stores, in the storing unit, identification information of the Web application program related to the Web page based on a script defined in the Web page.

4. The electronic apparatus as claimed in claim 1, further comprising:

an authentication unit configured to authenticate an operator based on identification information of the operator entered in the electronic apparatus, wherein the display control unit stores, in the storing unit, the identification information of the operator by associating the identification of the operator with the identification information of the program.

5. The electronic apparatus as claimed in claim 1, wherein the display control unit stores, in the storing unit, identification information of the function of the electronic apparatus executed based on the definition of the screen information by associating the identification information of the function with the identification information of the program.

6. The electronic apparatus as claimed in claim 1, wherein the display control unit stores, in the storing unit, the identification information of the program corresponding to the screen information when the function of the image forming apparatus is successfully executed by the apparatus browser.

7. The electronic apparatus as claimed in claim 1, wherein the identification information of the program of the plurality of programs that was executed includes identification information of the Web application program and identification information of the apparatus browser that executed the Web application program.

8. An information processing system comprising:
   plural electronic apparatuses, and
      an information processing apparatus connected to the electronic apparatuses via a network, each of said plural electronic apparatuses having a plurality of functions for executing processes in the electronic apparatus by a plurality of programs and a particular program of the each of said plural electronic apparatuses, said each of the electronic apparatuses comprising:
      a central processing unit for processing a program installed in the electronic apparatus; and
      a display control unit configured to cause a display unit of the electronic apparatuses to display a screen based on screen information including a Web page for providing a cloud service, obtained via a network, for executing the plurality of functions of the electronic apparatuses, said screen information including a first screen information to display the screen and a second screen information to execute the plurality of functions of the electronic apparatus, said second screen information including a script to execute a function of an image forming apparatus that is readable by an apparatus browser, said display control unit being further configured to store, in the storing unit, identification information of a Web application program for providing the cloud service, said Web application program being related to the Web page of the cloud service according to execution of the function of the electronic apparatus based on definition of the Web page of the cloud service,
   wherein, when a request from a screen displayed in the display unit is related to the first screen information, the display control unit causes the display to display a screen according to the request,
   wherein, when the request is related to the second screen information, the display control unit stores, in a storing unit, identification information of a user of the electronic apparatus, identification information of a program of the plurality of programs that was executed corresponding to the screen information according to execution of the function of the electronic apparatuses based on definition of the screen information, and identification information of the function that has been executed by executing the program of the plurality of programs based on an extended script, said identification information of the user, program and function being associated with each other in the storing unit,
   wherein the apparatus browser is configured to transmit an HTTP request including a result of execution of the electronic apparatus based on the extended script to a Web server unit,
   wherein the identification information of the program includes identification information of the apparatus browser,
   wherein the storing unit further stores a distribution ratio of profit of the use of the electronic apparatus between the apparatus browser and the Web application program, and
   wherein the information processing system aggregates usage information of each of the plurality of programs from the plural electronic apparatuses based on information stored in the storing unit at a predetermined timing.

9. The information processing system as claimed in claim 8, wherein the usage information is a number of times of use or a use frequency.

10. The information processing system as claimed in claim 8, wherein the information processing apparatus includes the storing unit.

11. An information processing method in an information processing system including plural electronic apparatuses and an information processing apparatus connected to the electronic apparatuses via a network, each electronic apparatus having a plurality of functions for executing processes in the electronic apparatus by a plurality of programs and a particular program of the each electronic apparatus, said each electronic apparatus comprising: a display control unit configured to cause a display unit to display a screen based on screen information including a Web page for providing a cloud service, obtained via a network, for executing the plurality of functions of the electronic apparatus, said screen information including a first screen information to display the screen and a second screen information to execute the plurality of functions of the electronic apparatus, said second screen information including a script to execute a function of an image forming apparatus that is readable by an apparatus browser,
   the information processing method comprising:
      a displaying step, performed by the display control unit, when a request from a screen displayed in the display unit is related to the first screen information, of causing the display to display a screen according to the request,
      a storing step, performed by the display control unit of an electronic apparatus, when the request is related to the second screen information, of storing, in a storing unit, identification information of a user of the electronic apparatus, identification information of a program of the plurality of programs that was executed corresponding to the screen information according to execution of a function of the electronic apparatus based on definition of the screen information, and identification information of the function that has been executed by executing the program of the plurality of programs based on an extended script, said identification information of the user, program and function being associated with each other in the storing unit, said storing step further storing, by the display control unit, in the storing unit, identification information of a Web application program for providing the cloud service, said Web application program being related to the Web page of the cloud service according to execution of the function of the electronic apparatus based on definition of the Web page of the cloud service, and
      a transmitting step, by the apparatus browser, of transmitting an HTTP request including a result of execution of the electronic apparatus based on the extended script to a Web server unit,
      a step, performed by the information processing apparatus, of aggregating usage information of each of the plurality of programs from the electronic apparatuses based on information stored in the storing unit at a predetermined timing,
   wherein the identification information of the program includes identification information of the apparatus browser, wherein the storing unit further stores a distribution ratio of profit of the use of the electronic apparatus between the apparatus browser and the Web application program.

12. The information processing method as claimed in claim 11, wherein the usage information is a number of times of use or a use frequency.

* * * * *